United States Patent [19]
Lee

[11] Patent Number: 5,909,313
[45] Date of Patent: Jun. 1, 1999

[54] MULTIPLE IMAGE DIFFRACTIVE DEVICE

[75] Inventor: Robert Arthur Lee, Victoria, Australia

[73] Assignee: Commonwealth Scientific and Industrial Research Organisation, Territory, Australia

[21] Appl. No.: 08/553,366

[22] PCT Filed: May 25, 1994

[86] PCT No.: PCT/AU94/00279

§ 371 Date: Feb. 26, 1996

§ 102(e) Date: Feb. 26, 1996

[87] PCT Pub. No.: WO94/28444

PCT Pub. Date: Dec. 8, 1994

[30] Foreign Application Priority Data

May 25, 1993 [AU] Australia .................. PL9000

[51] Int. Cl.⁶ .................. G02B 5/18; G03H 1/08
[52] U.S. Cl. .................. 359/569; 359/572; 359/567; 359/2; 359/9
[58] Field of Search .................. 359/2, 9, 24, 25, 359/569, 571, 572, 574, 575, 567

[56] References Cited

U.S. PATENT DOCUMENTS

| | | |
|---|---|---|
| 4,568,141 | 2/1986 | Antes . |
| 4,988,151 | 1/1991 | Moss .................. 359/9 |
| 5,032,003 | 7/1991 | Antes . |
| 5,237,433 | 8/1993 | Haines et al. .................. 359/9 |
| 5,335,113 | 8/1994 | Jackson et al. . |
| 5,379,131 | 1/1995 | Yamazaki .................. 359/2 |
| 5,428,479 | 6/1995 | Lee . |
| 5,621,515 | 4/1997 | Hoshino et al. .................. 359/2 |
| 5,627,663 | 5/1997 | Horan et al. .................. 359/2 |

FOREIGN PATENT DOCUMENTS

| | | |
|---|---|---|
| 0240261 | 10/1987 | European Pat. Off. . |
| 0240262 | 10/1987 | European Pat. Off. . |
| 0467601 | 1/1992 | European Pat. Off. . |
| 272320 | of 1990 | Japan . |

*Primary Examiner*—Jon Henry
*Attorney, Agent, or Firm*—Sughrue, Mion, Zinn, Macpeak & Seas, PLLC

[57] ABSTRACT

A pixellated diffractive device includes a multiplicity of pixels in turn divided into multiple sub-pixels. The device is related to one or more pixellated diffraction surface structures which when illuminated generate respective corresponding optically variable images. The sub-pixels of each pixel of the diffractive device include diffractive elements arranged in one or more groups, the diffractive elements of each group matching diffractive elements of a corresponding single pixel of the respective pixellated diffraction surface structures. In each pixel of the device the diffractive elements of the or each said group are intermixed with other subpixels and cooperatively contribute a single element of the corresponding optically variable image which is generated on illumination of the diffractive device.

48 Claims, 2 Drawing Sheets

MULTIPLE IMAGE DIFFRACTIVE DEVICE

FIELD OF THE INVENTION

This invention relate to diffractive devices and to their manufacture and has particular though not exclusive application to the provision of optically variable security diffractive devices which may be adapted for affixment to or incorporation in, for example, currency notes, credit cards, charge cards, share certificates and the like.

BACKGROUND ART

The present applicant's international patent publication WO91/03747 (application PCT/AU90/00395) proposes a diffraction grating structure comprised of a multiplicity of pixels which are individual optical diffraction gratings so that the pixellated diffraction grating when illuminated generates an optically variable image. The applicant's pixellated diffraction gratings utilising curved line grating pixels have become known by the trademark Pixelgram (trade mark). According to preferred aspects of the arrangement disclosed in the international application, the respective diffraction grating of each grating pixel comprises a plurality of reflective or transmissive grooves or lines which are usually curved across a pixel. Groove or line curvature determines both local image intensity, e.g. shading, and local optical structural stability. Groove or line spacing in each pixel determines local colour properties, with non-primary colours generated by a pixel mixing. Average groove or line orientation determines movement or colour effects, and the number of distinct values of average curvature and average spacing may be viewed as defining the Pixelgram palette, by analogy with the language of computer graphics. A further disclosure of a security diffraction grating structure is to be found in international patent publication WO90/07133 (PCT/AU89/00542).

The present applicant's international patent publication WO93/18419 (PCT/AU93/00102) discloses how selected visually observable effects in the optically variable image may be generated by arraying the pixels in groups -within which the pixels are arranged according to a predetermined rule for the pixellated diffraction grating. Thus, for example, multiple sets of different images, or of the same image but different shading or colour, may be produced at different viewing angles.

The concept of providing multiple optically variable images at different viewing angles, using a pixellated diffractive device in which each pixel contains a sub-pixel corresponding to each image, is also disclosed in U.S. Pat. No. 5,032,003. In that case, each diffractive sub-pixel is a straight line grating. This is an example of a more general class of pixellated diffractive structures utilising straight line grating pixels and known by the trademark Kinegram.

Australian patent application 10499/92 proposes a pixellated diffraction grating structure with three channels which constitute views from different angles of the same image, in order to obtain a stereoscopic image. The gratings may be curved line gratings. A predecessor of this reference is Japanese patent (Kokai) publication 2-72320.

European patent publication 467601 is concerned with holographic diffraction grating patterns which may include curved line gratings. Overlaid or alternate channels are proposed for providing different images at different angles. The different images may include numerical information and logos.

SUMMARY OF THE INVENTION

The present inventor has now appreciated that the concepts of the aforementioned applications can be further extended to provide diffractive devices which give one or more optically variable images, by fracturing the pixels of each image into sub-pixels and then rearranging and interlacing the sub-pixels so that the sub-pixels cooperatively provide elements of the respective images. In proposing the further development, the inventor has appreciated that he can take advantage of the mathematical theorem in Fourier analysis that the Fourier transform of any diffractive function is translationally invariant.

The invention accordingly provides, in one aspect, a pixellated diffractive device comprising a multiplicity of pixels in turn divided into multiple sub-pixels, which device is related to one or more pixellated diffraction surface structures which when illuminated generate respective corresponding optically variable images. Sub-pixels of each pixel of the diffractive device include or consist of diffractive elements arranged in one or more groups. The diffractive elements of each group match diffractive elements of a corresponding single pixel of the respective pixellated diffraction surface structures. In each pixel of the device the diffractive elements of the or each said group are intermixed with other sub-pixels and cooperatively contribute a single element of the corresponding optically variable image which is generated on illumination of the diffractive device.

The invention also provides, in another aspect, a method of deriving at least a representation of a pixellated diffractive device, comprising a multiplicity of pixels in turn divided into multiple sub-pixels, which method comprises deriving at least a primary representation of each of one or more pixellated diffraction surface structures which when illuminated generate respective corresponding optically variable images, fracturing each pixel of the or each said primary representation into multiple diffractive elements, and deriving at least a secondary representation of said pixellated diffractive device by forming each pixel thereof so that sub-pixels thereof include or consist of diffractive elements arranged in one or more groups, the diffractive elements of each group matching diffractive elements of a corresponding single pixel of the respective said pixellated diffraction surface structure, wherein in each pixel of the device, the diffractive elements of the or each said group are intermixed with other sub-pixels and cooperatively contribute a single element of the said corresponding optically variable image.

In some prior references, the term "relief structure" is utilised interchangeably with or instead of "diffraction grating" or "diffraction surface structure". The term "diffraction surface structure" is employed herein to indicate a structure which is either reflective or transmissive. Without in any way limiting the scope of "diffraction surface structures", it is noted that such structures may include, for example, line or groove diffraction gratings, small squares, rectangles or polygons.

By "at least a representation" is meant that the respective integer may be actually formed, or, if not, at least a representation is formed. The representation may be a set of code or data defining the respective integer, e.g. in a computer memory means. The aforesaid deriving steps are preferably carried out in suitably programmed computer operations. The method may advantageously include the step of utilising the derived representation to drive a suitable machine, e.g. an electron beam lithography machine, to form the actual diffractive device.

Preferably, there are at least two optically variable images, each associated with a respective group of diffractive elements. The images may be the same or similar scenes but differently oriented or of different shading or colour. One or more further groups of sub-pixels of the device may collectively generate an optically invariable image.

There are preferably at least four sub-pixels per pixel, but more preferably at least 16 in a 4×4 square array of square sub-pixels. The pixels are preferably sufficiently small to be below the resolution limit of a healthy human eye, for example, less than 125 micron on edge and more preferably about 30 to 80, e.g. around 60 micron.

The diffractive sub-elements are preferably dispersed within each pixel so as to produce a predetermined discernible effect in the corresponding optically variable image. The dispersal of the diffractive elements may be chosen from a predetermined set of selections which therefore defines a mapping palette for the diffractive element array, again by analogy with the language of computer graphics. In a case where, in accordance with international patent publication WO91/03747, the respective diffraction surface structures forming the pixels of the pixellated diffraction surface structure have been formed, e.g. in relation to predetermined variables such as groove or line curvature, groove or line spacing and average groove or line orientation, from a primary palette, the aforementioned mapping palette forms a secondary palette and the diffractive device entails successive selections from both the primary and secondary palettes.

The diffractive elements within the pixels may involve classes of miniature diffraction gratings of cured and variably spaced grooves, or alternatively elementary arrays of polygon shaped relief structures (pixels within pixels of pixels or SQUOTS) of dimensions of the order of fractions of a micron. In general the transformed representations of the input images may involve classes of groups of diffractive elements. A class of different groups of diffractive elements is defined as a component palette of component pixel types. Since each element of a component palette is itself a group of diffractive elements, each diffractive element can be regarded as a member of a sub palette and hence each component palette is, in this embodiment, a palette of sub palettes (palettes within palettes).

The invention therefore also provides, in a further aspect, a method of forming a pixellated diffractive device in terms of a multiplicity of diffraction grating palettes wherein each palette contains mature diffraction grating groups and each group M is in itself a sub-pixel palette of N sub-pixel diffractive elements comprising defining the device by repeating each group M at predetermined locations within a large array of repeat group locations, the map of repeat group locations for each group M being determined by a set of complex mapping relations between the large array and a set of invariable image component maps which act co-operatively under the control of the mapping relations to define the inactive properties of the diffractive device thereby formed on said large array.

As already indicated, the images generated by the diffractive device may be either optically invariable or optically variable. An image is described herein as "optically variable" where it varies according to the position of observation and "optically invariable" where it remains substantially the same regardless of the position of observation. By "image" in the contex of this specification is meant the optical image observed by the naked eye focussed on the diffractive device when it is illuminated by an arbitrarily extended diffuse source of finite width such as a fluorescent tube. The term "image" is used herein in its broadest sense, not being limited to pictorial or diagrammatic images but extending, e.g. to figures, numnbers, data and codes.

It is an advantage of the present invention that the diffractive device may produce not only a mix of optically variable and optically invariable images but may also produce two or more different kinds of optically variable images. For example, the optical variable images may be of a Pixelgram type (i.e. each pixel is a curved line diffraction grating), a Kinegram type (i.e. each pixel is a straight line diffraction grating), or a mathematical hologram. For each case, the structure of the component mapping palettes is determined by the optical properties of the input images and the required optical properties of the component viewable images generated by the diffractive device.

The diffraction device may be provided on a suitable substrate, e.g. a metal foil, and/or may be affixed or formed in a carrier e.g. a currency note, credit card, bank account or ATM card, debit card, security card, charge card or prepaid card.

BRIEF DESCRIPTION OF THE DRAWINGS

The invention will now be further described, by way of example only, with reference to the accompanying diagrams, in which.

DESCRIPTION OF PREFERRED EMBODIMENTS

Figure 1A:
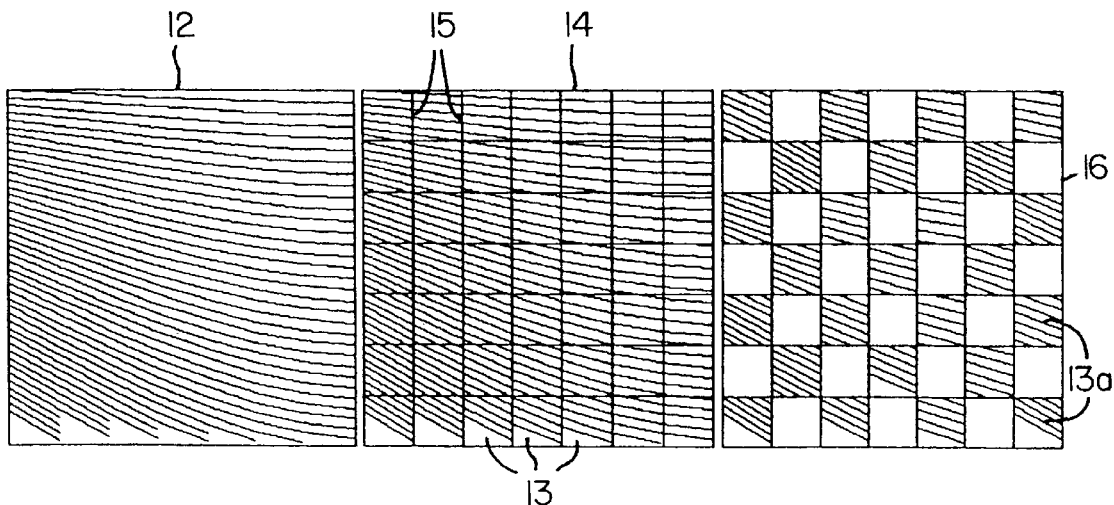
FIG. 1 is a diagrammatic representation of the formation of an embodiment of diffractive device in accordance with the invention, the diffractive device generating two different optically variable images and utilising Pixelgram-type curved line diffraction gratings.
Figure 1B:
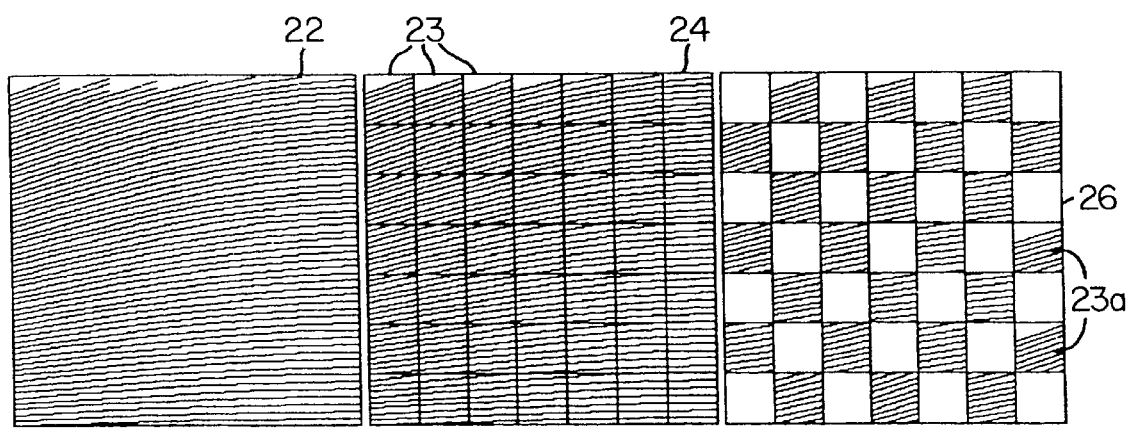
Figure 1C:
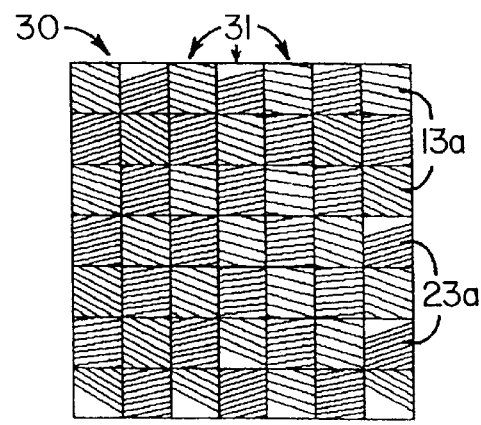

FIG. 1 depicts one pixel 12,22, for each of two pixellated diffraction gratings designed in accordance with the principles set out in international patent publication WO91/03747 and intended to produce respective different optically variable images when illuminated. The two pixels are preferably at corresponding coordinate positions in the respective gratings. It will be understood that each of the diffraction gratings does not necessarily physically exist at this stage and that each of the two illustrated pixels may merely have been designed in a computer system and this design set down as a representation in the form of a set of stored data, or more preferably as a code for a selection from a Pixelgram palette, as further discussed hereinafter.

As explained in international patent publication WO91/03747, the contents of which are incorporated herein by reference, the respective pixellated diffraction gratings are produced from an optically invariable image by first dividing up the image into square pixels (in this case 62.5 micron squares) and assessing the greyness factor, chroma or colour value, or more specifically the greynes factor, chroma or colour value of each pixel in turn. This process is typically carried out by exposing an image to a video camera coupled to a suitable computer system, the greyness factor for each pixel being stored in the computer memory. Groove or line curvature across a pixel determines both local image intensity, e.g. shading and local optical structural stability. Groove or line spacing in each pixel determines local colour properties, with non-primary colours generated by a pixel mixing. Average groove or line orientation determines movement and colour effects, and the number of distinct values of average curvature and average spacing may be viewed as defining the pixelgram palette by analogy with the language of computer graphics. The lines are derived from a function $S_{ij(x,y)}$ as more fully explained in international patent publication WO91/03747.

It is emphasised that the diffraction grating pixels 12,22 may be pixels of other forms of pixellated diffraction surface structure, e.g. Kinegram-type structures or holograms.

The next step is to fracture or divide the respective pixels 12,22, into multiple diffractive elements 13,23. A preferred fracturing is a simple n×n square array, depicted in FIG. 1 as a grid overlay 15. In this example, it is a 7×7 array 14,24 of square diffractive elements 13,23 of almost 9 micron sides, a total of 49 diffractive elements.

The set of diffractive elements is then sampled and displaced or rearranged so that approximately half of the diffractive elements of each set are rearranged in an even, spaced out array 16,26. It will be seen that the two arrays 16,26 are preselected so that, in each array, the retained diffractive elements 13a,23a occupy mutually exclusive positions. The two arrays can then be merged or interlaced to produce the combined pixel 30 in which the diffractive elements 13a,23a define a complete set of sub-pixels 31. In this simple case, sub-pixels 31 consist of diffractive elements 13a,23a.

This process may then be repeated for all the corresponding pixel of the two designed Pixelgram-type gratings. The resultant set of pixel representations, in the form of suitable data or code, is applied to an electron beam (or "E-beam") lithography system to produce the real grating. E-beam machines are particularly suitable for etching out a diffraction grating microgroove pattern in a substrate in accordance with the supplied data or codes. The aspect of the process is already known and is described, e.g., in International patent publication WO91/03747. In a practical application, a master diffractive device designed to generate characteristic images is made by the above method, and this master is subsequently utilized to produce authorised copies. The grating may be typically written as an array of square cut reflective grooves in a metallised surface, for example PMMA electron resist spin coated onto a chrome coated glass substrate. This substrate may then be processed to produce a gold coated nickel master. For example, a durable metal master of the optimised grating may be obtained by vacuum coating the photo-resist master with 2000 angstrom 99.99% gold and electro-depositing a thick layer of nickel to act as a support. After separating from the glass master, this gold coated nickel master may be bonded to a brass block and used as a die for hot pressing of authorised plastic film/foil replica gratings.

It will be seen from FIG. 1 that the design of the arrays 16,26 involves in some instances a substantial rearrangement of the relative positions of the diffractive elements within the pixel. Thus, their relative spatial arrangement is substantially different from their arrangement within original pixels 12,22, in which the diffractive elements co-operate as a contiguous surface structure. For example, the diffractive elements are not merely spread out but occupy different co-ordinate positions in the array. On the one hand, because of the aforementioned theorem of Fourier analysis, this does not affect the integrity of the combined contribution of the diffractive elements or sub-pixels to the corresponding single element or pixel of the viewed optically variable image. On the other hand, observable effects can be produced in the viewed image by particular relative rearrangements of the diffractive elements within a pixel. It is also necessary to take account of the loss of half of the diffractive elements. Thus, for example, it has been realised that in a diffraction grating pixel such as 12, the closest spaced lines towards the left and towards the bottom control the positive order components of the image generated when the grating is illuminated, and the greater spaced region towards the right and top more controls the negative order components. Thus, if the diffractive elements 13a retained in the array 16 are chosen more from the region towards the bottom left corner of pixel 12, there will be a strong positive bias in the contribution to the pixel of the image. A set of selections of different rules for sampling and displacing the diffractive elements 13,23 of the fractured array 14,24 can be predetermined as a secondary palette for the system.

Some examples of other effects able to be produced by respective selections from the secondary palette include:
(i) An "RGB" palette consisting of red, green and blue sub-palettes which together act cooperatively to produce a true colour image of the subject at one angle of view. The red, green and blue sub-palettes have carrier frequencies which differ slightly from each other, but the same range of greyness factors;
(ii) Transparency effects produced by an optically variable Pixelgram-type image in one component with a generalised grating as the second component;
(iii) An optically invariable image in one component and an optically variable image as the second component. The optically invariable image sub-palette consists of a palette of diffusely scattering pixels of different levels of greyness which produce a static image in zero-order.

It will now be understood that the general case combining the primary and secondary palettes can be viewed as a set of N component palettes with M1 elements in the first component palette, M2 elements in the second palette . . . and MN elements in the Nth component palette.

It will be appreciated that the fracturing, sampling/displacement and recombination steps in accordance with the preferred practice of the invention allow the production of complex multi-component diffractive devices for which the images have a much smoother appearance, since the effective image resolution can be increased due to the grid size being reduced to the size of a 5 to 15 micron diffractive element or sub-pixel rather than a full, e.g. 60 or so micron, pixel. The effective palette size has also been increased by the fracturing and sampling technique since it allows for the mixing in of additional specialize sub-pixels. Finally, fracturing, sampling and recombination allows for much more flexibility in assigning image element characteristics to the mathematical properties of the sub-pixels.

A number of further embodiments are possible within the general concept of the invention. For example, the sampling process involved in deriving the array 16,26 from the fractured pixel 14,24 may involve choosing only (n×n/z)–M diffraction elements from each pixel and then interlacing 2M sub-pixels not chosen from the main fractured pixels, with specialised optical properties, to fill the remaining areas of the eventual array. These additional sub-pixels may be designed to contribute special diffuse light effects, zero order diffraction effects or applications-specific colour switch effects to the final image.

Figure 2:
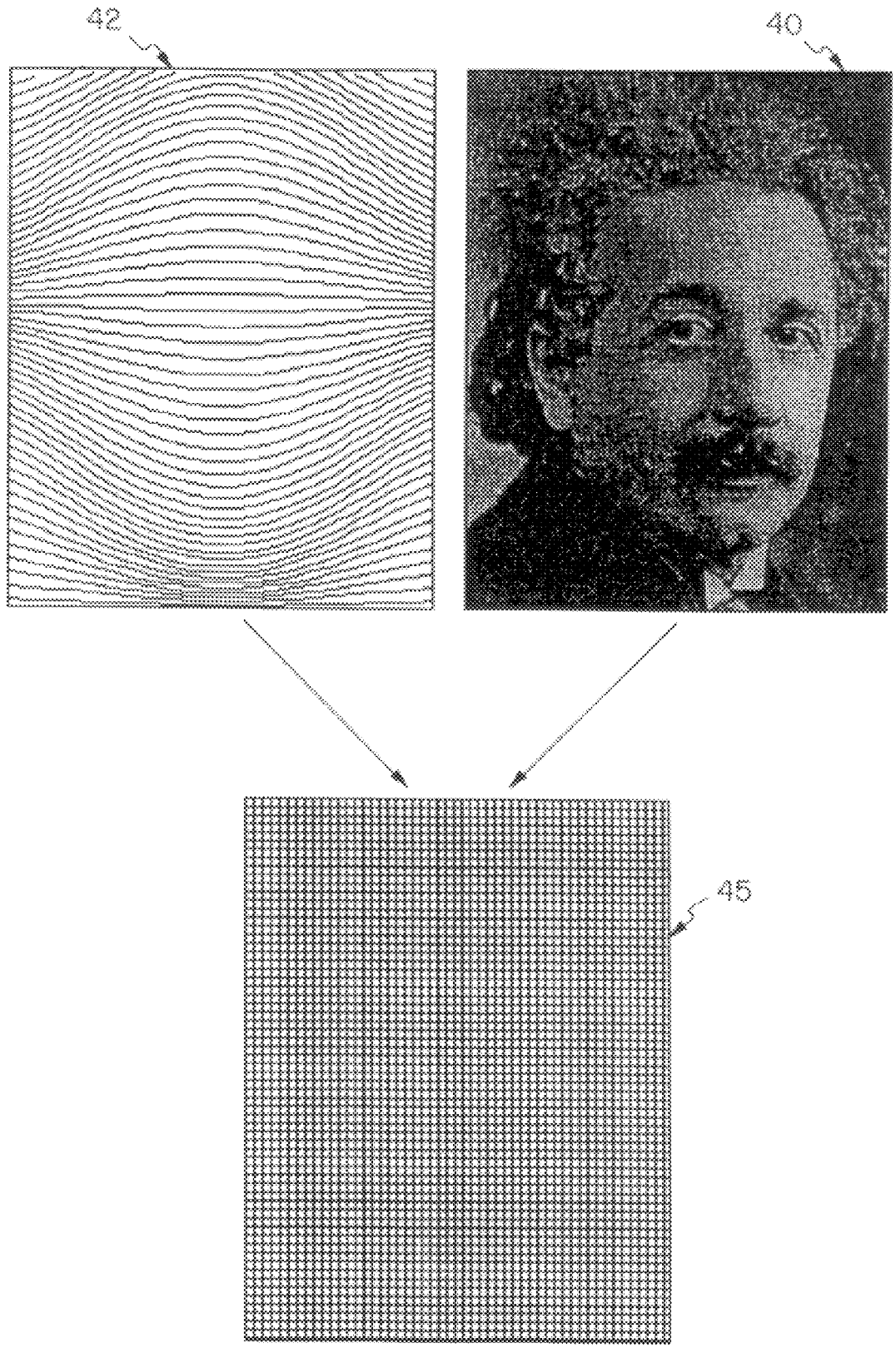
FIG. 2 is a diagrammatic representation of a further embodiment of the invention; and In FIGS. 1 and 2, the optical effect arising from slight discontinuities or steps in the grating lines is a printer artifact.

In another alternative embodiment (FIG. 2), also indicated as secondary palette (ii) above, a Pixelgram-type pixellated diffraction grating 40, shown here as generating an optically variable image recognisable as Albert Einstein, may be combined with a non-pixellated generalised diffraction grating 42 consisting of a curved groove pattern with variable spacings between the grooves. The result is a diffractive device 45 which under illumination produces one or more optically variable semi-transparent images embedded in a background diffractive field. Because the background generalised grating is relatively slowly varying when compared to the very small scale pixellated grating pattern, the background grating pattern will produce relatively large scale zero-order Talbot or Moire fringe patterns when the diffractive device is copied using holographic reflection contact printing techniques. The presence of the strong fringe pattern on the copy will ensure that the copy is markedly different from the original version and hence the type of diffractive device in accordance with an embodiment of the invention will have a high level of optical security.

It will be appreciated that in each of these embodiments, each of a group M of miniature diffraction grating groups is repeated at predetermined locations within a large array of repeat group locations. The map of these locations for each group M is determined by set of complex mapping relations between the large array and a set of invariable image component maps which act co-operatively under the control of the mapping relations to define the diffractive properties of the diffractive device thereby formed on said large array. The mapping relation required to produce the type of diffractive device described in the preceding paragraph is similar to that required for the device illustrated in FIG. 1 except that the generalised grating pattern first needs to be redefined mathematically as a set of n×m small grating elements that can be interpreted as grating pixels able to be combined with the n×m pixels of the input Pixelgram-type component. This redefinition of the generalised grating can be achieved by overlying the grating with an imaginary n×m grid and then calculating the average groove spacing and azimuth angle or groove orientation within each grid element or pixel. The generalised grating then becomes a set of n×m conventional straight line grating pixels of different orientations which can be fractured, sampled, displaced and interlaced with corresponding sub-pixels of the corresponding Pixelgram type grating pixels.

Throughout this specification and the claims which follows, unless the context requires otherwise, the word "comprise", or variations such as "comprises" or "comprising", will be understood to imply the inclusion of a stated integer or group of integers but not the exclusion of any other integer or group of integers.

We claim:

1. A complex multi-component diffractive device, comprising; a multiplicity of diffractive pixels, each pixel being divided into at least a plurality of sub-pixel groups composed of a pre-selected group of diffractive elements, the diffractive elements of each sub-pixel group being derived from a subdivision of a spatially corresponding pixel of a primary pixellated diffractive surface structure which, when illuminated, generates an optically variable image, and wherein, in each of said pixels of said device, each sub-pixel group is intermixed in a gridded array with at least one other sub-pixel group corresponding to the pixel subdivision of another primary pixellated diffractive surface structure, such that the resultant array of all sub-pixel groups of each pixel of the diffractive device generates a multi-component optical effect, which effect is at least an observable modification of the individual component pixel optical effects generated by each pixel of each of said primary pixellated diffractive surface structures under similar illumination conditions.

2. A pixellated diffractive device according to claim 1, wherein said multicomponent optical effect comprises at least two optically variable images.

3. A pixellated diffractive device according claim 1, wherein said sub-pixels are so dispersed within each pixel as to produce a predetermined discernible effect in the corresponding optically variable image.

4. A pixellated diffraction device according to claim 1, wherein said sub-pixels are so dispersed within each pixel that their relative spatial arrangement is substantially different from their arrangement within said corresponding single pixel, in which the sub-pixels co-operate as a contiguous surface structure.

5. A pixellated diffractive device according to claim 2, wherein said optically variable image are the same or similar scenes, but differently orientated or of different shading or colour.

6. A pixellated diffractive device according to claim 1, wherein one or more further groups of sub-pixels of the device co-operatively generate an optically invariable image on illumination of the device.

7. A pixellated diffractive device according to claim 1, wherein there are at least 16 sub-pixels per pixel in a 4×4 array of square sub-pixels.

8. A pixellated diffractive device according to claim 1, wherein said pixels are sufficiently small to be below the resolution limit of a healthy human eye.

9. A pixellated diffractive device according to claim 1, wherein said sub-pixels comprise respective miniature diffraction gratings of curved and variably spaced grooves.

10. A pixellated diffractive device according to claim 1, wherein said sub-pixels comprise polygon shaped relief structures of dimensions of the order of fractions of a micron.

11. A pixellated diffractive device according to claim 1, comprising at least three sub-pixel groups, each group including diffractive elements of a single color, such that the three groups co-operate to produce a true color image at a particular angle of view.

12. A pixellated diffractive device according to claim 11, wherein the respective colors of the three groups are red, green and blue.

13. A pixellated diffractive device according to claim 1, where there are at least three sub-pixel groups within each pixel of the diffractive device, and each of three sub-pixel groups contains a set of diffractive elements resulting from the pixel subdivision of a corresponding one of three primary pixellated diffractive surface structures representing respectively the red, green and blue color components of a true color image, whereby the diffractive device displays this same true color image at a particular angle of view under an illuminating light source.

14. A pixellated diffractive device according to claim 1, wherein each pixel of the device contains two interlaced sub-pixel groups, one group corresponding to a subdivision of a pixel of a pixellated diffractive surface structure in which the pixel grating lines are curved, and the other group corresponding to subdivisions of elementary grid areas of a generalized diffraction grating of curved and variably spaced lines, such that observed images generated by the diffractive device have the appearance of a generalized diffraction grating pattern seen through a transparent or semi-transparent diffraction image generated by said diffractive surface structure in which the pixel grating lines are curved.

15. A pixellated diffractive device according to claim 14, wherein the generalized diffraction grating pattern is a relatively slowly varying groove pattern designed such that any attempted copying of the diffractive device, using the method of holographic contact copying, results in a copied image with overlaid relatively large scale Talbot or Moire fringe effects, not present on the original diffractive device.

16. A pixellated diffractive device according to claim 1, wherein said groups of sub-pixels produce an optically variable image on illumination.

17. A pixellated diffractive device according to claim 1, further including one or more groups of diffusely scattering sub-pixels which produce an optically invariable image on illumination.

18. A pixellated diffractive device according to claim 8, wherein said pixels are less than 125 microns square.

19. A pixellated diffractive device according to claim 1, wherein each pixel of the device contains two interlaced sub-pixel groups, one of which corresponds to a subdivision of the pixels of a first pixellated diffractive surface structure in which the pixel grating lines are curved, and the other of which corresponds to the subdivision of the pixels of a second pixellated diffraction surface structure in which the pixel grating lines are straight, wherein observed images generated by the diffractive device under an illuminating light source have optical characteristics of both said first and second diffractive surface structures.

20. A pixellated diffractive device according to claim 1, wherein each pixel of the device contains two interlaced sub-pixel groups, one of which corresponds to the pixel sub-division of a primary pixellated diffractive surface structure and the other of which corresponds to the pixel subdivision of a diffusely scattering image device containing multiple levels of greyscale information, such that observed images generated by the pixellated diffractive device, under an illuminating light source, contain both optically variable image information of the primary pixellated diffractive surface structure as well as zero order optically invariable image information of the diffusely scattering image device, and wherein the zero order optically invariable image information contains similar multiple levels of greyscale information as said levels present in the original diffusely scattering image device.

21. A pixellated diffractive device according to claim 1, wherein the individual diffractive elements making up each sub-pixel are spatially located in said gridded array at locations in said array which are spatially distant from their respective locations within said corresponding pixel.

22. A pixellated diffractive device according to claim 1, wherein the multi-component optical effect is the same as the individual component pixel optical effects.

23. A method of deriving at least a representation of a complex multi-component pixellated diffractive device comprised of a multiplicity of diffractive pixels which are each divided into sub-pixels, which method comprises;
(a) deriving at least a primary representation of each of one or more pixellated diffractive surface structures which, when illuminated, generate respective optically variable images,
(b) subdividing each pixel of the or each said primary representation into plural diffractive elements, and
(c) deriving at least a secondary representation of a multi-component pixellated diffractive device by forming each pixel thereof as a plurality of sub-pixel groups, each sub-pixel group being composed of a pre-selected group of said diffractive elements of a spatially corresponding pixel of a said pixellated diffractive surface structure, and wherein, in each of said pixels of said device, each sub-pixel group is intermixed in a gridded array with at least one other sub-pixel group composed of diffractive elements derived by subdividing a pixel of another primary representation, so that the resultant array of all groups of sub-pixels of each pixel of the diffractive device generates a multi-component optical effect, which effect is at least an observable modification of the individual component pixel optical effects generated by each pixel of each of said primary representations under similar illumination conditions.

24. A method according to claim 23, wherein said secondary representation is a set of code or data.

25. A method according to claim 23, wherein said deriving steps are carried out in programmed computer operations.

26. A method according to claim 23, further including utilizing the derived secondary representation to drive a machine, to form the actual diffractive device.

27. A method according to claim 23, wherein said multi-component optical effect comprises at least two optically variable images.

28. A method according claim 27, wherein said sub-pixels of the secondary representation are so dispersed within each pixel as to produce a predetermined discernible effect in the corresponding optically variable image.

29. A method according claim 27, wherein said sub-pixels of the secondary representation are so dispersed within each pixel that their relative spatial arrangement is substantially different from their arrangement within said corresponding single pixel, in which the sub-pixels co-operate as a contiguous surface structure.

30. A method according to claim 27, wherein said optically variable images are the same or similar scenes but differently orientated or of different shading or colour.

31. A method according to claim 27, wherein said steps (a)–(c) are effected whereby one or more further groups of sub-pixels of the device co-operatively generate an optically invariable image on illumination of the device.

32. A method according to claim 23, wherein there are at least 16 said sub-pixels per pixel in a 4×4 array of square sub-pixels.

33. A method according to claim 23, wherein said pixels are sufficiently small to be below the resolution limit of a healthy human eye.

34. A method according to claim 23, wherein said sub-pixels comprise respective miniature diffraction gratings of curved and variably spaced grooves.

35. A method according to claim 23, wherein said sub-pixels comprise polygon shaped relief structures of dimensions of the order of fractions of a micron.

36. A method according to claim 23, wherein said sub-pixels are dispersed within each pixel according to one of a predetermined set of selections which therefore defines a mapping palette for said gridded array.

37. A method according to claim 36, wherein the respective diffraction surface structures forming the pixels of the pixellated diffraction surface structure are formed from a primary palette that incorporates predetermined variables including groove or line curvature, groove or line spacing and average groove or line orientation, said mapping palette forming a secondary palette and the diffractive device entailing successive selections from both the primary and secondary palettes.

38. A method according to claim 26, wherein said machine is an electron beam lithography machine.

39. A method according to claim 23, wherein said secondary representation is derived such that three of the sub-pixel groups include diffractive elements of respective individual colors, these three sub-pixel groups co-operating to produce a true color image at a particular angle of view.

40. A method according to claim 39, wherein the individual colors are red, green and blue.

41. A method according to claim 39, wherein a pixellated diffractive surface structure according to said representation, when illuminated, generates optically variable images.

42. A method according to claim 23, further including effecting said steps (a)–(c) whereby there are included a further one or more groups of diffusely scattering sub-pixels which produce an optically invariable image on illumination of the device according to said representation.

43. A method according to claim 33, wherein said pixels are less than 125 microns square.

44. A method according to claim 23, wherein the multi-component optical effect is the same as the individual component pixel optical effects.

45. A computer program product which stores machine readable instructions that, when installed in a computer with an appropriate operating system and memory, are operable to carry out the method of claim 23.

46. A method of forming a pixellated diffractive device in terms of a multiplicity of diffraction grating pixel palettes wherein each pixel palette contains diffraction grating groups and each group M is in itself a sub-pixel palette of N sub-pixel diffractive elements, comprising defining the device by repeating the diffractive elements of each group M at predetermined locations within an array of multiple repeat group locations, the map of repeat group locations for the diffractive elements of each group M being determined by a set of complex mapping relations between said array and a set of invariable image component maps which act co-operatively under the control of the mapping relations to define the diffractive properties of the diffractive device thereby formed on said array, which diffractive properties cause a multi-component optical effect which is an observable modification of the individual component pixel optical effects generated by each of said sub-pixel diffractive elements.

47. A pixellated diffractive device formed by the method of claim 46.

48. A stored set of data defining a pixellated diffractive device according to claim 47.

* * * * *